(12) United States Patent
Hunter et al.

(10) Patent No.: US 8,059,755 B2
(45) Date of Patent: Nov. 15, 2011

(54) METHOD FOR DISCERNING A DESIRED SIGNAL FROM AN INTERFERING SIGNAL IN AN UNDER SAMPLED SYSTEM

(75) Inventors: Jeffrey Kent Hunter, Olathe, KS (US); Timothy Gibson, Overland Park, KS (US)

(73) Assignee: Honeywell International Inc., Morristown, NJ (US)

( * ) Notice: Subject to any disclaimer, the term of this patent is extended or adjusted under 35 U.S.C. 154(b) by 872 days.

(21) Appl. No.: 12/108,279

(22) Filed: Apr. 23, 2008

(65) Prior Publication Data

US 2009/0323873 A1 Dec. 31, 2009

(51) Int. Cl.
*H04L 27/00* (2006.01)
(52) U.S. Cl. .................................................. 375/316
(58) Field of Classification Search .............. 375/259, 375/316, 324, 350; 379/387.02; 324/607; 341/126, 127, 128, 155, 156, 159
See application file for complete search history.

(56) References Cited

U.S. PATENT DOCUMENTS

| | | | |
|---|---|---|---|
| 6,111,911 A * | 8/2000 | Sanderford et al. | 375/147 |
| 2003/0171100 A1* | 9/2003 | Petersson et al. | 455/141 |
| 2006/0239389 A1* | 10/2006 | Coumou | 375/346 |
| 2007/0086544 A1* | 4/2007 | Fudge et al. | 375/316 |

* cited by examiner

*Primary Examiner* — Sam K Ahn
(74) *Attorney, Agent, or Firm* — Fogg & Powers LLC

(57) ABSTRACT

Described herein are methods and apparatuses for receiving a desired signal at a signal receiver with an undersampling frequency. A signal converter with a local oscillator frequency, a bandpass filter, and an analog-to-digital converter are used to generate an aliased discrete-time spectrum from an input analog spectrum. In order to determine the presence of interfering signals in the aliased discrete-time spectrum and, if present, separate a desired signal from the interfering signal, the local oscillator frequency is shifted. The original discrete-time spectrum and the resulting shifted discrete-time spectrum are both analyzed to select a local oscillator frequency that does not cause interference with the desired signal when the discrete-time spectrum is generated. The selected local oscillator frequency is then utilized to process the desired signal.

30 Claims, 10 Drawing Sheets

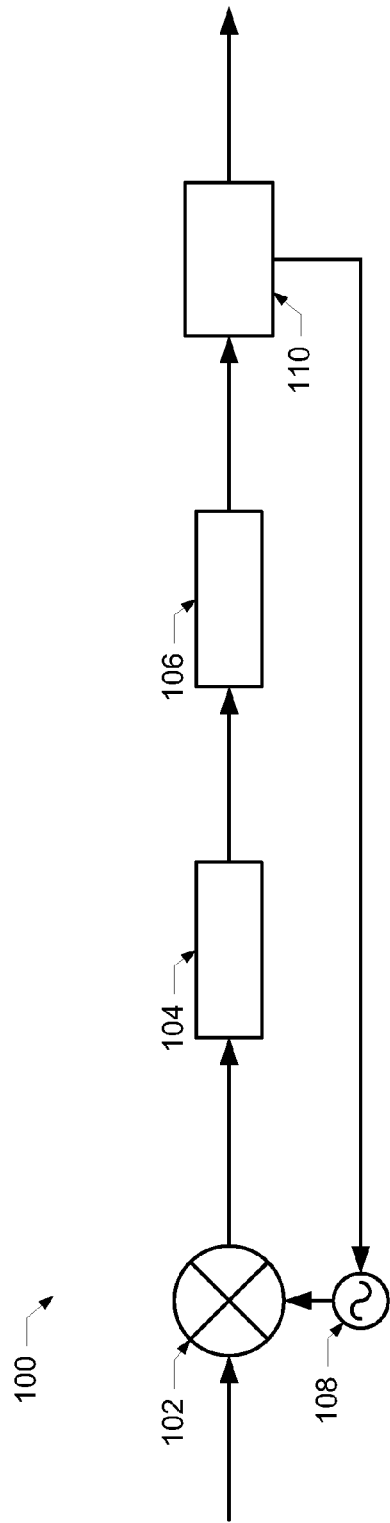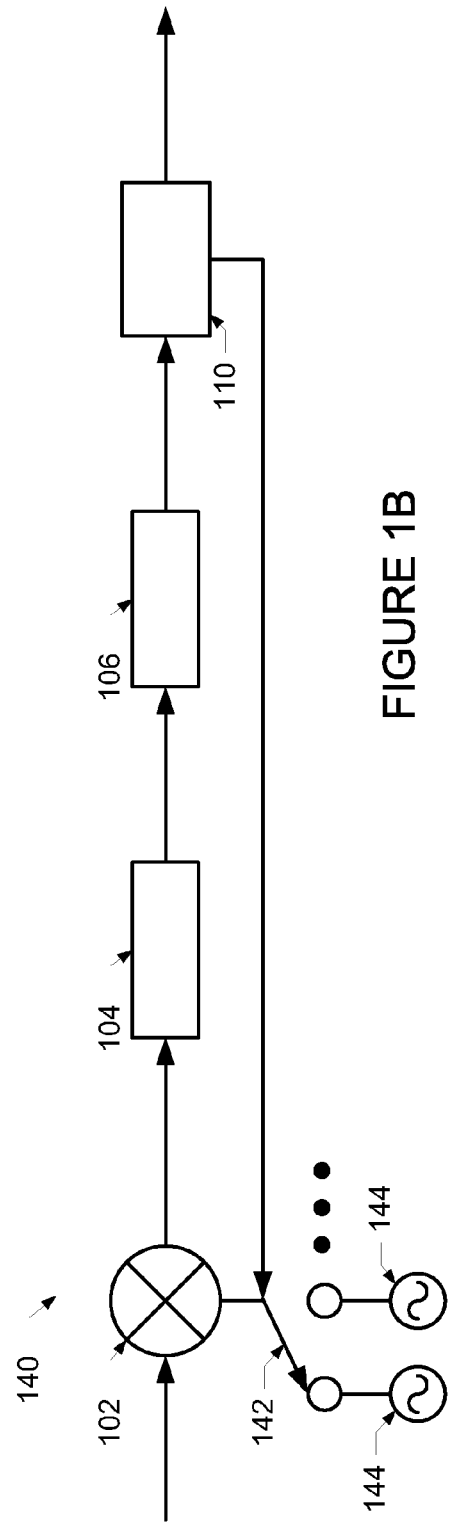

METHOD FOR DISCERNING A DESIRED SIGNAL FROM AN INTERFERING SIGNAL IN AN UNDER SAMPLED SYSTEM

FIELD OF THE INVENTION

The invention described herein is related to wireless radio communication systems, and more particularly, to an apparatus and a method for receiving a desired signal in an undersampled wireless radio communication system.

BACKGROUND

Distance Measuring Equipment (DME) is a transponder-based radio navigation technology that measures distance by timing the propagation delay of radio signals. The DME operates by transmitting to and receiving paired pulses from the ground station. The transmitter in the aircraft sends out very narrow pulses. These signals are received at the ground station and trigger a second transmission on a different frequency. These reply pulses are sensed by timing circuits in the aircraft's receiver that measure the elapsed time between transmission and reception. Electronic circuits within the radio convert this measurement to electrical signals that operate the distance and ground speed indicators. Tactical Air Navigation, or TACAN, is a navigation system used by military aircraft.

A typical DME system is composed of a UHF transmitter/receiver (interrogator) in the aircraft and a UHF receiver/transmitter (transponder) on the ground. DME transponders transmit on a radio channel frequency and receive on a corresponding channel frequency. The band is divided into 126 channels for interrogation and 126 channels for transponder replies. The interrogation and reply frequencies always differ by 63 MHz. The spacing of all channels is 1 MHz with a signal spectrum width of 100 kHz. The minimum operational performance standards for various DME systems include RTCA DO-189 for Airborne Distance Measuring Equipment (DME) Operating within the Radio Frequency Range of 960-1215 Megahertz, RTCA DO-181 C for Air Traffic Control Radar Beacon System/Mode Select (ATCRBS/MODE S) Airborne Equipment, and RTCA DO-282A for Universal Access Transceiver (UAT) Automatic Dependent Surveillance Broadcast (ADS-B)

To save part cost and size in a radio communication system in DME, it is desirable to use the lowest cost and slowest analog-to-digital converters that will properly sample the information band. Lower sample rates, however, cause interfering signals that are aliased onto the desired signal in the data conversion process if they are not properly reduced in amplitude prior to data conversion. Lower sample rates thus necessitate increases in radio part costs in the form of narrow band anti alias radio frequency (RF) filters needed to remove interfering signals. It is therefore desirable to separate the desired signal from interfering signals without incurring additional part cost in a radio communication system using low sample rate analog-to-digital converters.

BRIEF SUMMARY OF THE INVENTION

Described herein are an apparatus and a method for receiving a desired signal at a signal receiver. In one embodiment, an apparatus is provided for receiving a desired signal, including a signal converter for downconverting an input signal using a local oscillator, a bandpass filter for generating an analog spectrum, an analog-to-digital converter for generating a discrete-time spectrum by undersampling the analog spectrum such that aliasing of communications channel frequencies occurs within the discrete-time spectrum, and a signal processor for determining that a signal is present at a desired channel frequency, controlling the local oscillator to alter the local oscillator frequency, analyzing the discrete-time spectrum for the presence of an interfering signal, and processing the desired signal.

According to a further embodiment, the frequency of the local oscillator is shifted such that the content of the discrete-time spectrum is shifted correspondingly. The analog spectrum is bandlimited to two Nyquist bands. The analog bandwidth of the bandpass filter is greater than the Nyquist bandwidth and less than twice the Nyquist bandwidth.

According to some embodiments, determining that the signal is present at a desired channel frequency is performed via a Fast Fourier Transform (FFT) or a digital downconverter comprising a numerically controlled oscillator and a low pass digital filter.

According to a further embodiment, the desired signal is in a Distance Measurement Equipment (DME) band, a Tactical Air Navigation (TACAN) band, an Air Traffic Control Transponder and Universal Access Transceiver (UAT) band, or another avionics band. The signal processor can be a digital signal processor (DSP), firmware driven by a software module, or an application-specific integrated circuit (ASIC).

In one embodiment, a method is provided for receiving a desired signal, including (a) generating an analog spectrum using a local oscillator and a bandpass filter; (b) generating a discrete-time spectrum by undersampling the analog spectrum such that aliasing of communications channel frequencies occurs within the discrete-time spectrum; (c) determining that a signal is present at a desired channel frequency; (d) shifting the local oscillator frequency to generate a shifted analog spectrum and a correspondingly shifted discrete-time spectrum; (e) analyzing the shifted discrete-time spectrum for the presence of an interfering signal; and (f) processing a desired signal.

In some embodiments, the analog spectrum is bandlimited to two Nyquist bands. The analog bandwidth of the bandpass filter is greater than the Nyquist bandwidth and less than twice the Nyquist bandwidth. Determining that the signal is present at a desired channel frequency is performed via a Fast Fourier Transform (FFT) or a digital downconverter comprising a numerically controlled oscillator and a low pass digital filter.

According to some embodiments, processing the desired signal is performed via returning to the original local oscillator frequency.

According to some embodiments, the method comprises analyzing the discrete-time spectrum for the presence of a potential interfering signal, wherein the potential interfering signal causes interference in the shifted analog spectrum. The method may determine that the potential interfering signal is not present and retain the shifted local oscillator frequency. The method may determine that the potential interfering signal is present and again shift the local oscillator frequency to generate a second shifted discrete time spectrum.

According to still a further embodiment, (d) and (e) are performed periodically. In addition, the desired signal is in a Distance Measurement Equipment (DME) band, a Tactical Air Navigation (TACAN) band, an Air traffic control Transponder and Universal access transceiver (UAT) band, or another avionics band.

In an alternative embodiment, a method is provided for receiving a desired signal at a desired channel frequency, including (a) receiving an input signal in a first analog spectrum; (b) downconverting the first analog spectrum to a second analog spectrum using a first local oscillator frequency and a band-pass filter; (c) undersampling the second analog spectrum and analyzing a first corresponding discrete-time spectrum; (d) downconverting the first analog spectrum to a third analog spectrum using a second local oscillator frequency and a second band-pass filter; (e) undersampling the third analog spectrum and analyzing a second corresponding discrete-time spectrum to determine the presence of a first interfering signal; (f) processing a desired signal.

According to some embodiments, the second and the third analog spectrums are bandlimited to two Nyquist bands. The first and the second bandpass filters are greater than the Nyquist bandwidth. The analog bandwidths of the first and the second bandpass filters are less than twice the Nyquist bandwidth.

According to some embodiments, the method includes determining that the first interfering signal is not present and processing the desired signal is performed via the first local oscillator frequency.

According to still a further embodiment, the method may further include analyzing the first corresponding discrete-time spectrum to determine the presence of a second interfering signal, wherein the second interfering signal causes interference in the second discrete-time spectrum. The method may determine that the second interfering signal is not present and processing the desired signal is performed via the second oscillator frequency. The method may further determine that the second interfering signal is present and processing the desired signal is performed via a third local oscillator frequency.

According to still a further embodiment, determining whether the second interfering signal is present may be performed periodically. The method may utilize more than three local oscillator frequencies in order to receive the desired signal. In addition, the input signal is in a Distance Measurement Equipment (DME) band, a Tactical Air Navigation (TACAN) band, an Air traffic control Transponder and Universal access transceiver (UAT) band, or another avionics band.

These as well as other aspects, advantages, and alternatives will become apparent to those of ordinary skill in the art by reading the following detailed description, with reference where appropriate to the accompanying drawings. Further, it is understood that this summary is merely an example and is not intended to limit the scope of the invention as claimed.

BRIEF DESCRIPTION OF THE DRAWINGS

The objects, features and advantages of the present invention will be more readily appreciated upon reference to the following disclosure when considered in conjunction with the accompanying drawings, in which:

FIGS. 1A and 1B depicts a diagram of one embodiment and a diagram of an alternative embodiment of an apparatus for receiving a desired signal.

DETAILED DESCRIPTION

Figure 2:
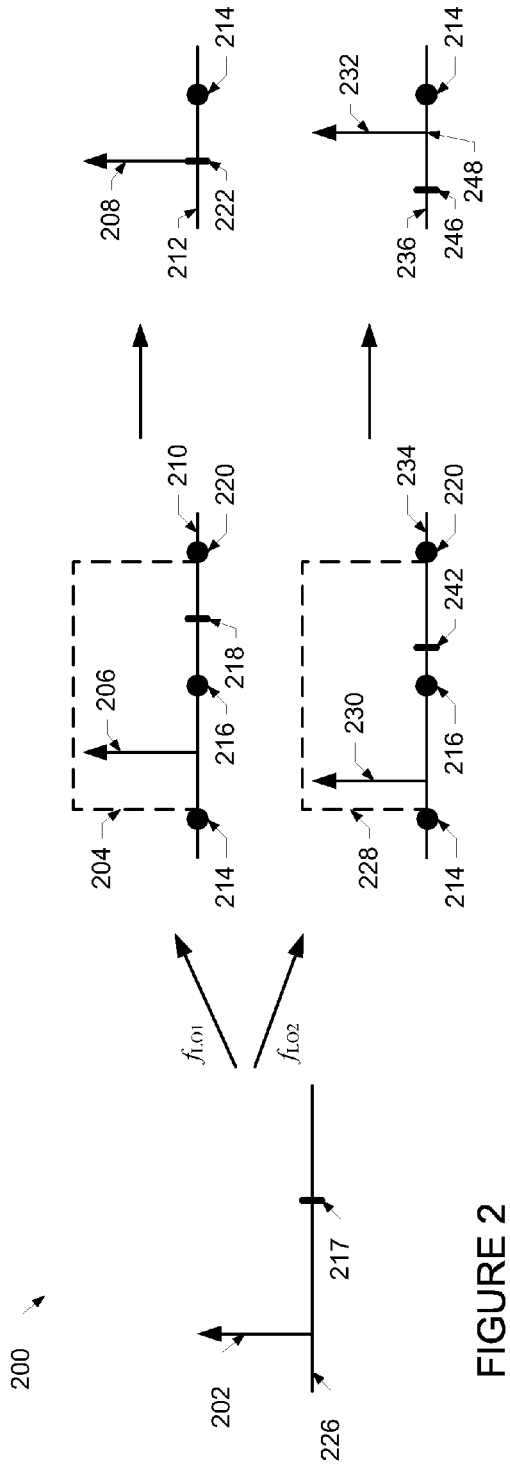
FIG. 2 depicts the operation of the apparatus for receiving a desired signal, wherein no interfering signal is present.

As shown in FIG. 1A, one embodiment 100 of an apparatus for receiving a desired signal includes a signal converter 102 for downconverting an input signal using a local oscillator 108, a bandpass filter 104 for generating an analog spectrum, an analog-to-digital converter (ADC) 106 for generating a discrete-time spectrum by undersampling the analog spectrum such that aliasing of communications channel frequencies occurs within the discrete-time spectrum, and a signal processor 110 for determining that a signal is present at a desired channel frequency, controlling the local oscillator 108 to alter the local oscillator frequency, analyzing the discrete-time spectrum for the presence of an interfering signal, and processing the desired signal.

According to the embodiment depicted in FIG. 1A, the local oscillator 108 is tunable. As the frequency of the local oscillator 108 is shifted by the signal processor 110, the content of the discrete-time spectrum is shifted correspondingly. According to an alternative embodiment 140 as shown in FIG. 1B, the apparatus for receiving a desired signal may include a plurality of local oscillators 144. The signal processor 110 may control a switch 142 to selectively connect one of the local oscillators 144 to the signal converter 102. Furthermore, in system 140, each of the local oscillators 144 has a uniquely predetermined local oscillator frequency. When each of the plurality of local oscillators 144 is connected to the signal converter 102, the content of the discrete-time spectrum is shifted according to the selected local oscillator frequency.

According to the embodiment depicted in FIGS. 1A and 1B, the signal processor 110 may be a digital signal processor (DSP), firmware driven by software, or an application-specific integrated circuit (ASIC). Furthermore, determining that the signal is present at a desired channel frequency is performed by the signal processor 110 via a Fast Fourier Transform (FFT) software module or a digital downconverter comprising a numerically controlled oscillator and a low pass digital filter (not shown). Specifically, the signal processor 110 may employ FFT to convert the output of the ADC 106 to frequency data in a frequency domain and detect the presence of signal energy in the desired frequency in the resulting frequency domain. Alternatively, the output of the ADC 106 may be down converted to a base-band digital signal by a numerically controlled oscillator with a frequency equal to the desired signal frequency, and then filtered by a low pass digital filter. The signal processor 110 may then determine the presence of desired signal by examining the signal energy in the resulting digital signal.

In the systems depicted in FIGS. 1A and 1B, the desired signal is in a Distance Measurement Equipment (DME) band, a Tactical Air Navigation (TACAN) band, an Air traffic control Transponder and Universal access transceiver (UAT) band, or another avionics band.

Figure 3:
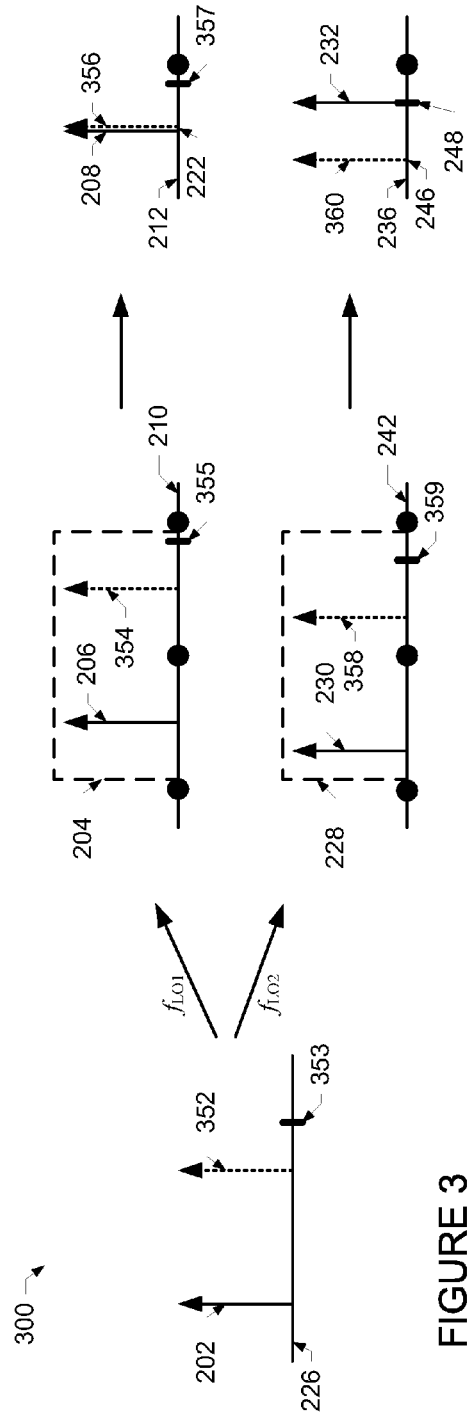
FIG. 3 depicts the operation of the apparatus for receiving a desired signal, wherein one interfering signal is present and a pre-check process is performed.
Figure 4:
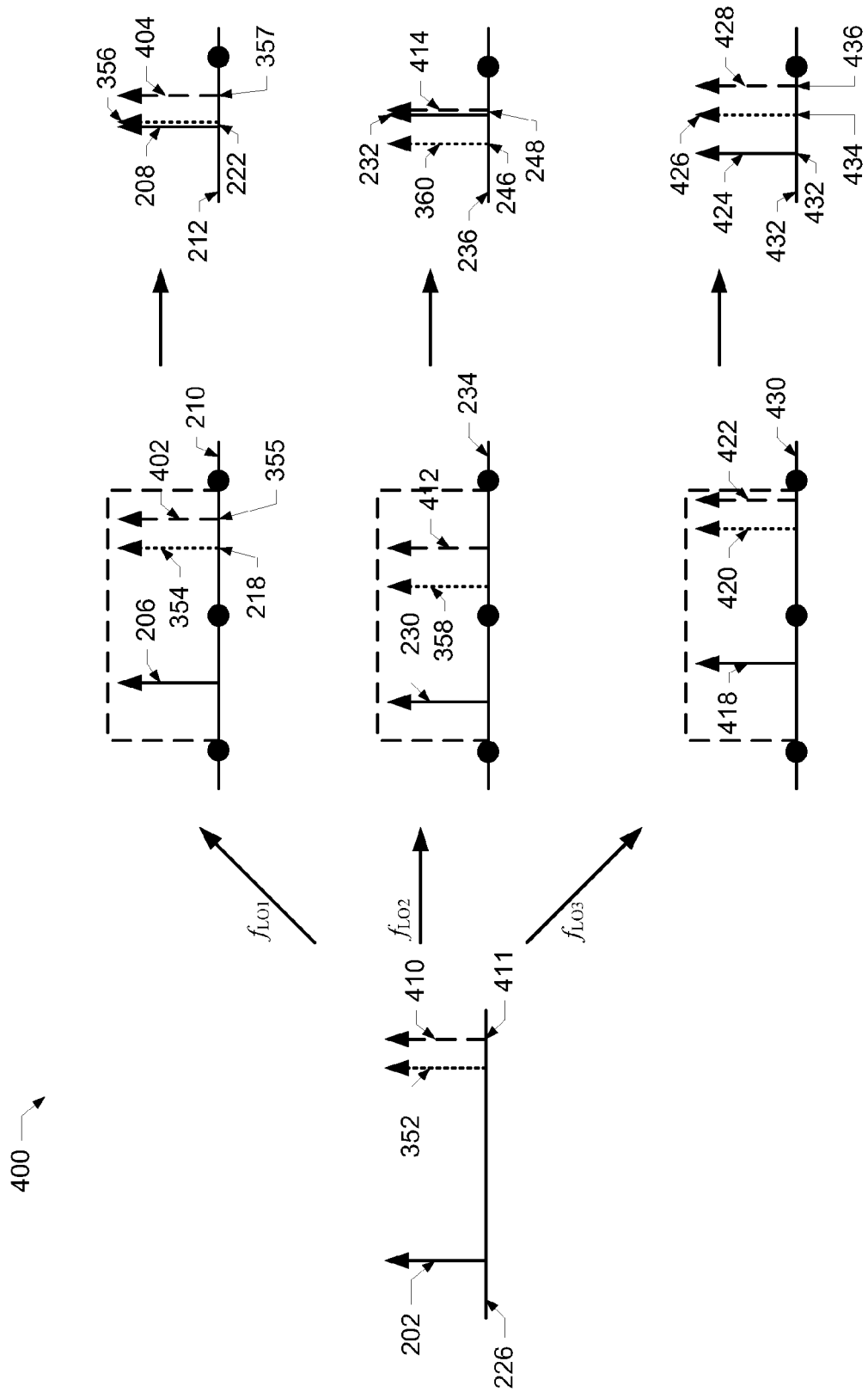
FIG. 4 depicts the operation of the apparatus for receiving a desired signal, wherein two interfering signals are present and the pre-check process is performed.

The operation of the apparatus for receiving a desired signal is described in FIGS. 2, 3, and 4. With respect to FIG.

2, an input spectrum 226 is an analog spectrum including a desired signal 202 received by the apparatus at a desired channel frequency $f_D$. For the purpose of illustration, $f_D$ is assumed 1075 MHz. The apparatus first downconverts the input spectrum 226 to an analog spectrum 210 utilizing the signal converter 102, the local oscillator 108 with a local oscillator frequency $f_{LO1}$, and the bandpass filter 104. For the example depicted in FIG. 2, $f_{LO1}$ is assumed 1000 MHz. The desired signal 202 (at 1075 MHz) is therefore converted to a signal 206 (at 75 MHz) in the analog spectrum 210. The analog spectrum 210 is then sampled to a discrete-time spectrum 212 by the analog-to-digital converter (ADC) 106 having a sampling frequency $f_S$ equal to 100 MHz. The frequencies 214, 216, and 220 are the Nyquist frequency $f_N$, the sampling frequency $f_S$, and the triple Nyquist frequency, respectively, wherein the Nyquist frequency $f_N$ is one half of the sampling frequency $f_S$ and equal to 50 MHz. A Nyquist band is defined as a range of frequencies between a multiple of the Nyquist frequency and the next multiple of the Nyquist frequency, wherein the first Nyquist band (the base band) is the range between the origin (not shown) and the frequency 214 (50 MHz), the second Nyquist band is the range between the frequencies 214 and 216 (100 MHz), the third Nyquist band is the range between the frequencies 216 and 220 (150 MHz), etc. In addition, the analog bandwidth of the bandpass filter 104 is greater than the Nyquist bandwidth (e.g. 50 MHz) and less than twice the Nyquist bandwidth (e.g. 100 MHz).

Since the Nyquist frequency $f_N$ (50 MHz) is lower than at least a portion of the frequencies of the analog spectrum 210, aliasing of communications channel frequencies occurs within the discrete-time spectrum 212 when the analog spectrum 210 is undersampled. As the example shown in FIG. 2, the desired signal 206 in the second Nyquist band of the analog spectrum 210 is aliased to a desired signal 208 at an aliased desired channel frequency 222 in the first Nyquist band of the discrete-time spectrum 212, wherein the aliased desired channel frequency 222 is equal to 25 MHz and may be determined by the local oscillator frequency $f_{LO1}$ and the Nyquist frequency $f_N$ as |1075 MHz−1000 MHz−100 MHz|=25 MHz. On the other hand, the channel frequency 218 (125 MHz) in the third Nyquist band of the analog spectrum 210 is also aliased onto the aliased desired channel frequency 222 since |125 MHz−100 MHz|=25 MHz.

The signal processor 110 may then determine whether a signal is present at the aliased desired channel frequency 222 in the discrete-time spectrum 212. If a signal is not present at the aliased desired channel frequency 222, the apparatus then returns to the initial step to receive another input signal. On the other hand, as depicted in FIG. 2, if a signal is present at the aliased desired channel frequency 222, the signal processor 110 may then process the signal at the aliased desired channel frequency 222.

Alternatively, before processing the signal, the signal processor 110 may further determine if the signal (or a portion thereof) at the aliased desired channel frequency 222 is contributed by interfering signals such as an interfering signal at the channel frequency 218 (125 MHz) downconverted from a channel frequency 217 ($f_{I1}$) in the input spectrum 226, wherein $f_{I1}$ is equal to 1125 MHz. In order to check for the presence of such interfering signal, the local oscillator frequency is shifted to a shifted local oscillator frequency $f_{LO2}$, for instance, $f_{LO2}$ equal to 1005 MHz, and the input spectrum 226 is again downconverted to a shifted analog spectrum 234 and then undersampled to a shifted discrete-time spectrum 236. Accordingly, the desired signal 202 is downconverted to a desired signal 230 in the shifted analog spectrum 234 and then aliased to a desired signal 232 in the shifted discrete-time spectrum 236. The channel frequency 218 that was aliased onto the desired channel frequency 222 in the discrete-time spectrum 212 is now aliased onto an aliased channel frequency 246, while the desired channel is shifted to a desired channel frequency 248 in the shifted discrete-time spectrum 236, wherein the channel frequency 246 is equal to |1125 MHz−1005 MHz−100 MHz|=20 MHz and the desired channel frequency 248 is equal to |1075 MHz−1005 MHz−100 MHz|=30 MHz. The shifted discrete-time spectrum 236 is then analyzed by the signal processor 110 for the presence of an interfering signal at the channel frequency 246.

According to one embodiment depicted in FIG. 2, it is determined that the interfering signal is not present at the channel frequency 246, indicating that the signal present at the original 208 desired channel frequency is not contributed by an interfering signal, and the signal processor 110 may then control the local oscillator 108 to return to the original local oscillator frequency $f_{LO1}$ to process the desired signal 208 at the desired channel frequency 222 in the discrete-time spectrum 212.

With respect to FIG. 3, the input spectrum 226 includes a desired signal 202 (at 1075 MHz) and an interfering signal 352 (at 1125 MHz). As the input spectrum 226 is converted to the discrete-time spectrum 212 by the apparatus utilizing the local oscillator frequency $f_{LO1}$ (1000 MHz), the desired signal 206 (at 75 MHz) and the interfering signal 354 (at 125 MHz) are undersampled to the desired signal 208 and an interfering signal 356, both falling onto the desired channel frequency 222 (25 MHz). In order to determine the presence of such signals as the interfering signal 356, the local oscillator frequency is shifted to the shifted local oscillator frequency $f_{LO2}$ (1005 MHz). The desired signal 202 and the interfering signal 352 are therefore converted to the desired signal 230 (at 70 MHz) and interfering signal 358 (at 120 MHz) and then undersampled to the desired signal 232 at the desired channel frequency 248 (30 MHz) and an interfering signal 360 at the channel frequency 246 (20 MHz), respectively. As the shifted discrete-time spectrum 236 is analyzed by the signal processor 110, as shown in FIG. 3, it is determined that the aliased interfering signal 360 is present at the aliased channel frequency 246, which indicates that the signal at the channel frequency 222 in the discrete-time spectrum 212 is contributed by the interfering signal 352 at a channel frequency 217 (1125 MHz) in the input spectrum 226, and therefore the signal processor 110 does not process the desired signal 202 utilizing the local oscillator frequency $f_{LO1}$ due to the presence of the interfering signal 356 at the desired channel frequency 222. The signal processor 110 may then retain the shifted local oscillator frequency $f_{LO2}$ to process the desired signal 202.

Alternatively, the signal processor 110 may again shift the local oscillator frequency to a targeted local oscillator frequency different from the original local oscillator frequency ($f_{Lo1}$=1000 MHz) and the shifted local oscillator frequency ($f_{Lo2}$=1005 MHz) to process the desired signal 202, according to the result of a pre-check process depicted in FIGS. 3 and 4.

In the pre-check process, the signal processor 110 determines whether a potential interfering signal is present at a channel frequency in the discrete-time spectrum that may be aliased onto the desired channel frequency in the shifted discrete-time spectrum when the input spectrum is downconverted by the shifted local oscillator frequency $f_{LO2}$. If it is determined that such potential interfering signal is not present, the signal processor 110 controls the local oscillator 108 to retain the shifted local oscillator frequency $f_{LO2}$ to process the desired signal 202. For example in FIG. 3, after the input spectrum 226 is downconverted by the local oscillator frequency $f_{LO1}$ (1000 MHz) and undersampled to the discrete-time spectrum 212, the signal processor 110 may analyze the discrete-time spectrum 212 to determine whether there is a potential interfering signal at an aliased channel frequency 357 equal to 35 MHz, which is aliased from a channel frequency 355 (135 MHz) downconverted from a channel frequency 353 (1135 MHz) in the input spectrum 226. On the other hand, the channel frequency 353 (1135 MHz), when downconverted by the shifted local oscillator frequency $f_{LO2}$ (1005 MHz) to the channel frequency 359 (130 MHz) and undersampled by the ADC 106, is aliased onto the aliased desired channel frequency 248 (30 MHz) in the discrete-time spectrum 236. As depicted in FIG. 3, the absence of a potential interfering signal at the channel frequency 353 allows the signal processor 110 to use the shifted local oscillator frequency $f_{LO2}$ (1005 MHz) to process the desired signal at the aliased desired channel frequency 248 (30 MHz). Therefore, the signal processor 110 then controls the local oscillator to retain the shifted local oscillator frequency $f_{LO2}$ (1005 MHz) to process the desired signal at the shifted aliased desired channel frequency 248.

On the other hand, if it is determined that the potential interfering signal is present, the signal processor 110 may control the local oscillator 108 to again shift the local oscillator frequency to a targeted frequency different from the original local oscillator frequency and the shifted local oscillator frequency to process the desired signal. As the example depicted in FIG. 4 wherein a pre-check process 400 is depicted, it is determined that, when the input spectrum is downconverted by the local oscillator frequency $f_{LO1}$ (1000 MHz) and undersampled to the discrete-time spectrum 212, a potential interfering signal 404 is present at the aliased channel frequency 357 (35 MHz). The potential interfering signal 404 is undersampled from a signal 402 at the channel frequency 355 (135 MHz) in the second analog spectrum 210 that is downconverted from a signal 410 at the channel frequency 411 (1135 MHz) in the input spectrum 226. The signal 410, when downconverted by the shifted local oscillator frequency $f_{Lo2}$ (1005 MHz) to a signal 412 in the shifted analog spectrum 234 and undersampled by the ADC 106, causes an interfering signal 414 at the aliased desired channel frequency 248 (30 MHz) at which the desired signal 232 is also located. In order to further separate the desired signal 202 from the signal 410 in a discrete-time spectrum, the signal processor controls the local oscillator 108 to again shift the local oscillator frequency. As it is depicted in FIG. 4, the local oscillator frequency is shifted to a third local oscillator frequency $f_{LO3}$ (995 MHz). The desired signal 202 (at 1075 MHz) and the interfering signals 352 (at 1125 MHz) and 410 (at 1135 MHz) are then downconverted and undersampled to an aliased desired signal 424 at a desired channel frequency 432 (20 MHz) and aliased signals 426 and 428 at channel frequencies 434 (30 MHz) and 436 (40 MHz), respectively, in a third discrete-time spectrum 432. Consequently, the desired signal 424 is now substantially separated from signals 426 and 428 and no interference occurs within the discrete-time spectrum 432 when the input spectrum 226 is undersampled.

According to an alternative embodiment, there may be more than one interfering signal present in the input spectrum 226 such that more than two unique local oscillator frequencies are necessary to separate the desired signal. Accordingly, the pre-check process is applied to more than one channel frequency in the discrete-time spectrum 212 to identify a targeted local oscillator frequency that does not cause interference when the input spectrum is downconverted and undersampled. The aliased channel frequencies in the discrete-time spectrum 212 on which the pre-check process is performed may be calculated from the original local oscillator frequency, the targeted local oscillator frequency, the Nyquist frequency, and the desired channel frequency in the input spectrum 226. For example, for a targeted local oscillator frequency of 1005 MHz and the desired channel frequency of 1075 MHz, the desired channel frequency in the shifted discrete-time spectrum is determined as |1075 MHz−1005 MHz−100 MHz|=30 MHz. The frequency of a potential interference signal that may be aliased to the same desired channel frequency when the targeted local oscillator frequency is applied is determined as |30 MHz+100 MHz+1005 MHz|=1135 MHz. Therefore the aliased channel frequency in the original discrete-time spectrum to which the pre-check process should be applied is determined as |1135 MHz−1000 MHz−100 MHz|=35 MHz.

According to another embodiment, for a given desired channel frequency and a given original local oscillator frequency, a pre-check channel frequency is calculated for each targeted local oscillator frequency and saved in a look-up table in the signal processor 110. When the input spectrum is downconverted and undersampled to the discrete-time spectrum, the signal processor 110 may analyze the discrete-time spectrum to select a targeted local oscillator frequency corresponding to a pre-check channel frequency at which no potential interfering signal is detected. The signal processor 110 may then control the local oscillator to shift the local oscillator frequency to the selected local oscillator frequency, or control the switch 142 to connect the signal converter 102 to a local oscillator with the selected local oscillator frequency.

According to still another embodiment, the two Nyquist bands of the analog spectrum generated from the input spectrum may be separated from each other. For example, the desired signal is in any odd Nyquist band (i.e. the $1^{st}$ Nyquist band, the $3^{rd}$ Nyquist band, etc.) while the interfering signals is in any even Nyquist band (i.e. the $2^{nd}$ Nyquist band, the $4^{th}$ Nyquist band, etc.), or vice versa.

Figure 5:
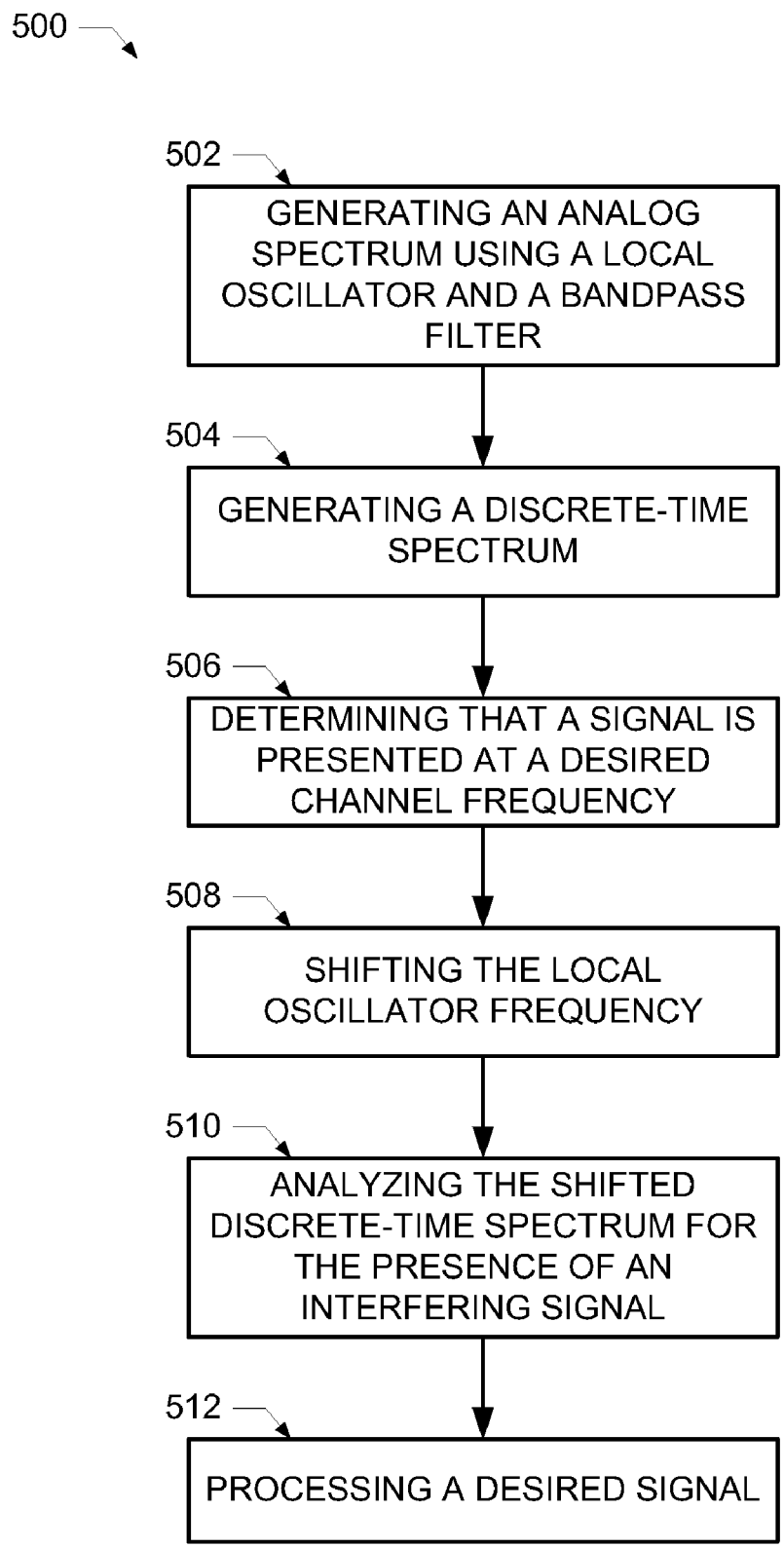
FIG. 5 depicts one embodiment of a method for receiving a desired signal.

According to one embodiment shown in FIG. 5, a method 500 is provided for receiving a desired signal, including generating an analog spectrum using a local oscillator and a bandpass filter (block 502), generating a discrete-time spectrum by undersampling the analog spectrum such that aliasing of communications channel frequencies occurs within the discrete-time spectrum (block 504), determining that a signal is present at a desired channel frequency (block 506), shifting the local oscillator frequency to generate a shifted analog spectrum and a correspondingly shifted discrete-time spectrum (block 508), analyzing the shifted discrete-time spectrum for the presence of an interfering signal (block 510), and processing a desired signal (block 512).

According to another embodiment, the analog spectrum is bandlimited to two Nyquist bands. The analog bandwidth of the bandpass filter is greater than the Nyquist bandwidth and less than twice the Nyquist bandwidth. Furthermore, the desired signal is in a Distance Measurement Equipment (DME) band, a Tactical Air Navigation (TACAN) band, an Air traffic control Transponder and Universal access transceiver (UAT) band, or another avionics band.

According to still another embodiment, determining that the signal is present at a desired channel frequency is performed via a Fast Fourier Transform (FFT) or a digital downconverter comprising a numerically controlled oscillator and a low pass digital filter.

Figure 6:
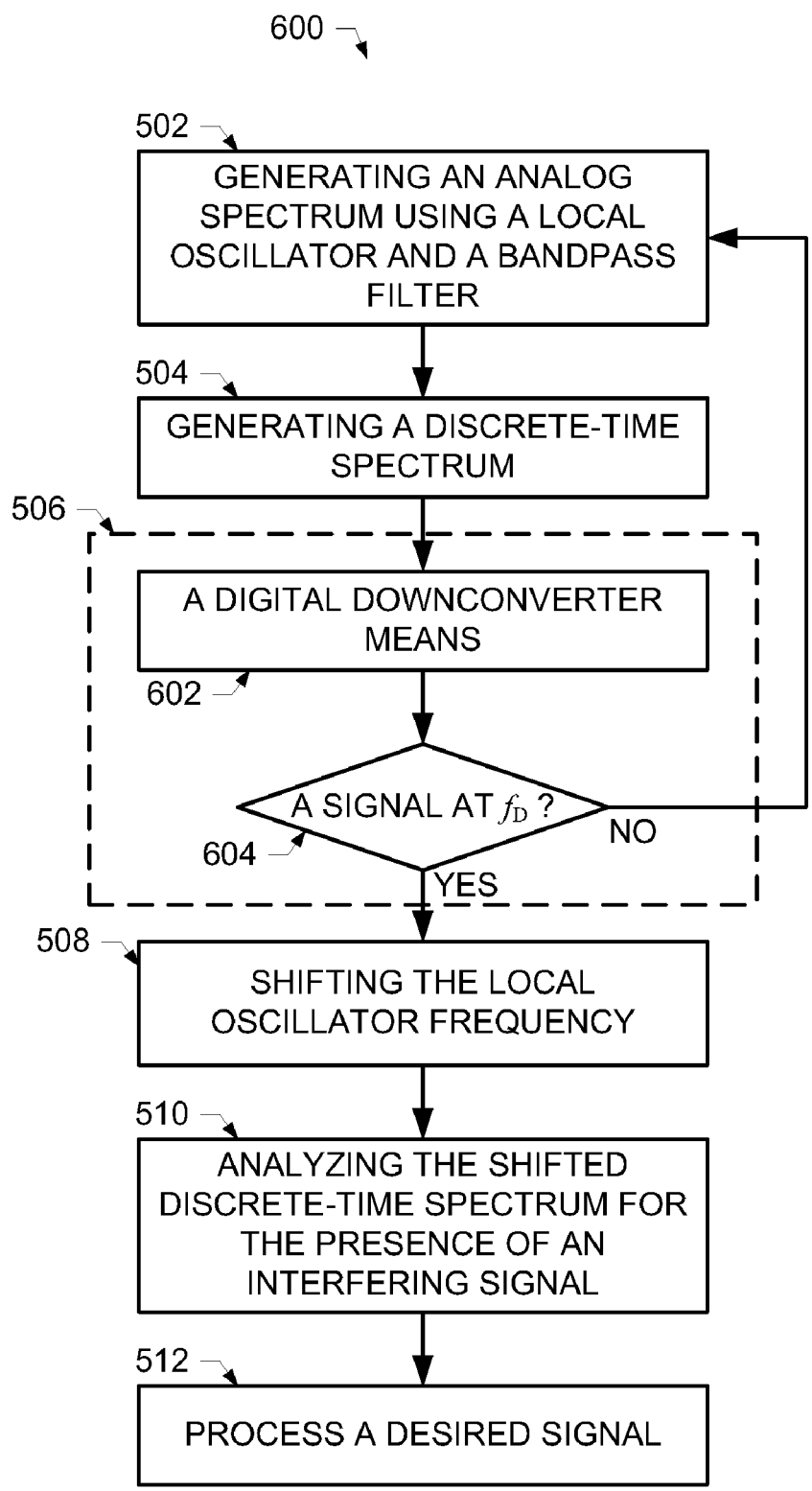
FIG. 6 depicts an alternative embodiment of the method for receiving a desired signal.

According to another embodiment shown in FIG. 6, a method 600 similar to the method 500 is provided for receiving a desired signal, wherein determining that the signal is present at a desired channel frequency (block 506) is performed via a Fast Fourier Transform (FFT) (not shown) or a digital downconverter 602 comprising a numerically controlled oscillator and a low pass digital filter (not shown). Determining that the signal is present at a desired channel frequency (block 506) further includes block 604 wherein the method 600 proceeds to shifting the local oscillator frequency (block 508) if a signal is presented at the desired channel frequency $f_D$ or back to generating an analog spectrum using a local oscillator and bandpass filter (block 502) if no signal is presented at the desired signal frequency $f_D$.

Figure 7:
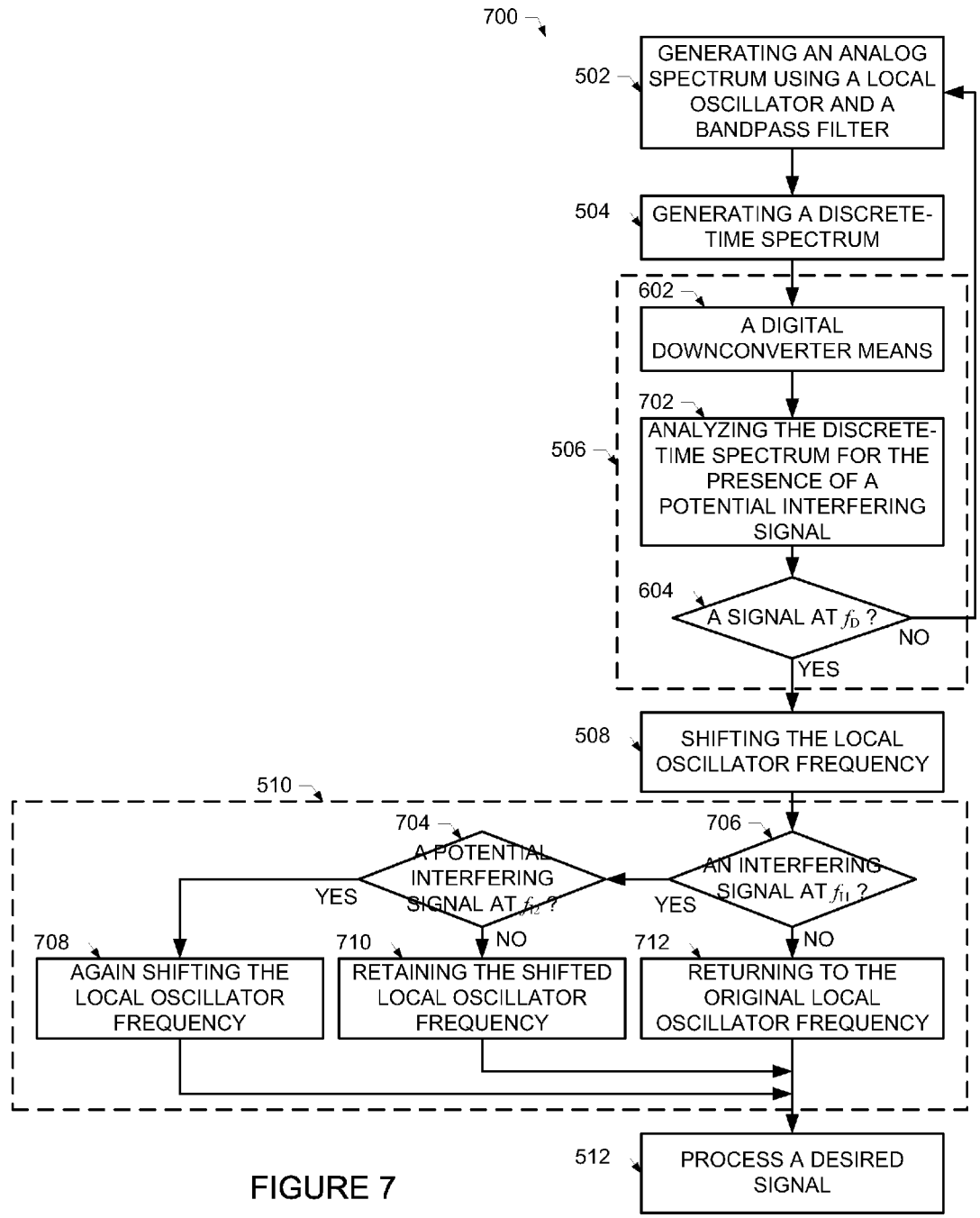
FIG. 7 depicts another embodiment of the method for receiving a desired signal.

According to still another embodiment shown in FIG. 7, a method 700 similar to the method 500 is provided for receiving a desired signal, wherein determining that the signal is present at a desired channel frequency (block 506) further includes analyzing the discrete-time spectrum for the presence of a potential interfering signal (block 702), wherein the potential interfering signal causes interference with the desired signal in the shifted analog spectrum. Furthermore, analyzing the shifted discrete-time spectrum for the presence of an interfering signal (block 510) further includes determining whether an interfering signal is present at a channel frequency $f_{I1}$ (block 706). If such interfering signal is not present (negative result from block 706), indicating that the signal at the desired channel frequency $f_D$ in the discrete-time spectrum is not contributed by any interfering signal from the channel frequency $f_{I1}$, the method 700 proceeds to returning to the original local oscillator frequency (block 712) to process the desired signal (block 512). If the interfering signal is present at the channel frequency $f_{I1}$ (positive result from block 706), indicating that the signal at the desired channel frequency $f_D$ in the discrete-time spectrum is contributed by an interfering signal from the channel frequency $f_{I1}$, the method 700 proceeds to checking whether a potential interfering signal is present at a channel frequency $f_{I2}$ (block 704) according to the result from block 702. If the potential interfering signal is not present at the channel frequency $f_{I2}$ (negative result from block 704), indicating that the shifted desired channel frequency in the shifted discrete-time spectrum does not contain any interfering signal from the channel frequency $f_{I2}$, the method 700 then proceeds to retaining the shifted local oscillator frequency (block 710) to process the desired signal (block 512). If the potential interfering signal is present at the channel frequency $f_{I2}$ (positive result from block 704), indicating that the shifted desired channel frequency in the shifted discrete-time spectrum contains an interfering signal from the channel frequency $f_{I2}$, the method 700 then proceeds to again shifting the local oscillator frequency (block 708) to process a desired signal (block 512).

According to still another embodiment, there may be more than one potential interfering signal that may interfere with the desired signal when the local oscillator frequency is shifted. The method 700 may identify a targeted local oscillator frequency according to the result of a pre-check process in block 702. Specifically, in the block 702, the method 700 may check more than one channel frequency in the discrete-time spectrum to select a targeted local oscillator frequency, wherein the selected local oscillator frequency does not cause interference with the desired signal when the shifted discrete-time spectrum is generated. Accordingly, in the block 706, if it is determined that an interfering signal is present at the channel frequency $f_{I1}$ (positive result from block 706), the method 700 may then shift to the targeted local oscillator frequency identified in block 702 to process a desired signal (block 512).

Figure 8:
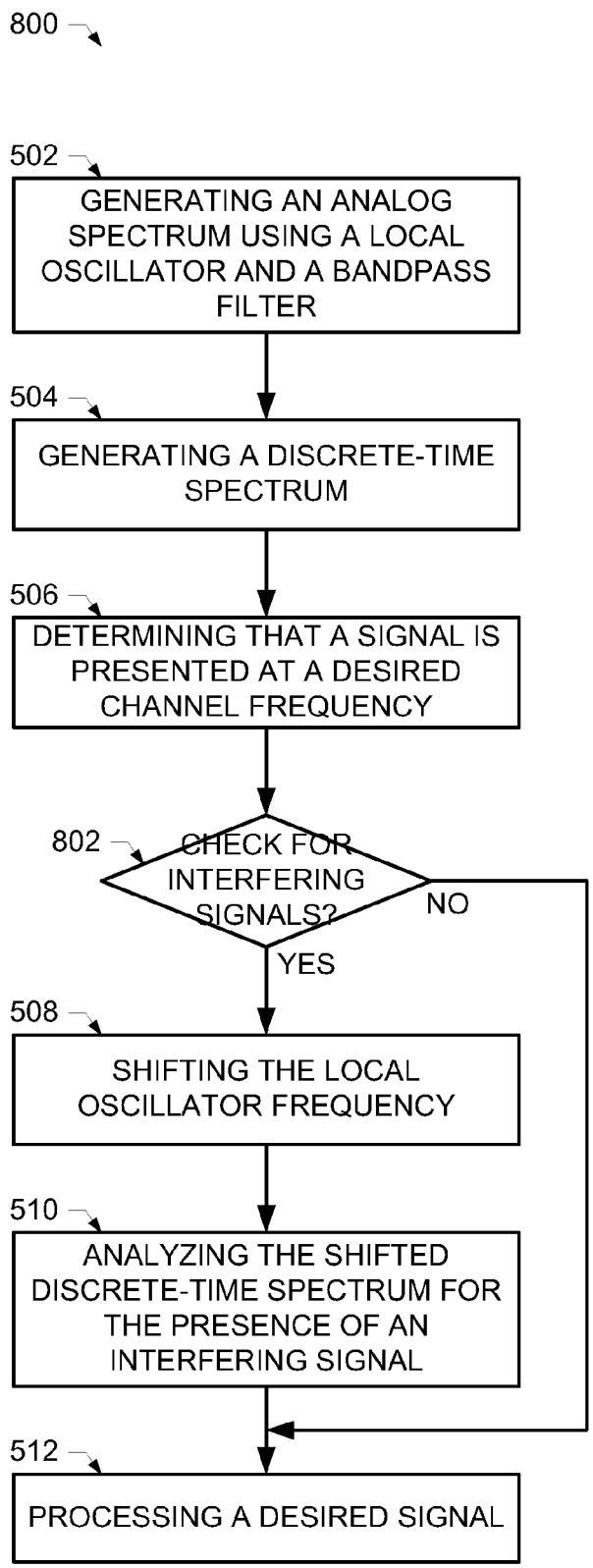
FIG. 8 depicts still another embodiment of the method for receiving a desired signal.

According to still another embodiment depicted in FIG. 8, a method 800 similar to the method 500 is provided for receiving a desired signal, wherein shifting the local oscillator frequency to generate a shifted analog spectrum and a correspondingly shifted discrete-time spectrum (block 508) and analyzing the shifted discrete-time spectrum for the presence of an interfering signal (block 510) are performed periodically. For example, a timer may be set at block 802, wherein the method 800 proceeds to shifting the local oscillator frequency (block 508) when the timer is expired (positive result from block 802), or otherwise to processing a desired signal (block 512). As another example, in block 802, the received signal at the desired channel frequency may be analyzed for potential interference. If potential interference is detected (positive result from block 802), the method 800 then proceeds to shifting the local oscillator frequency (block 802), or otherwise directly to processing a desired signal (block 512).

Figure 9:
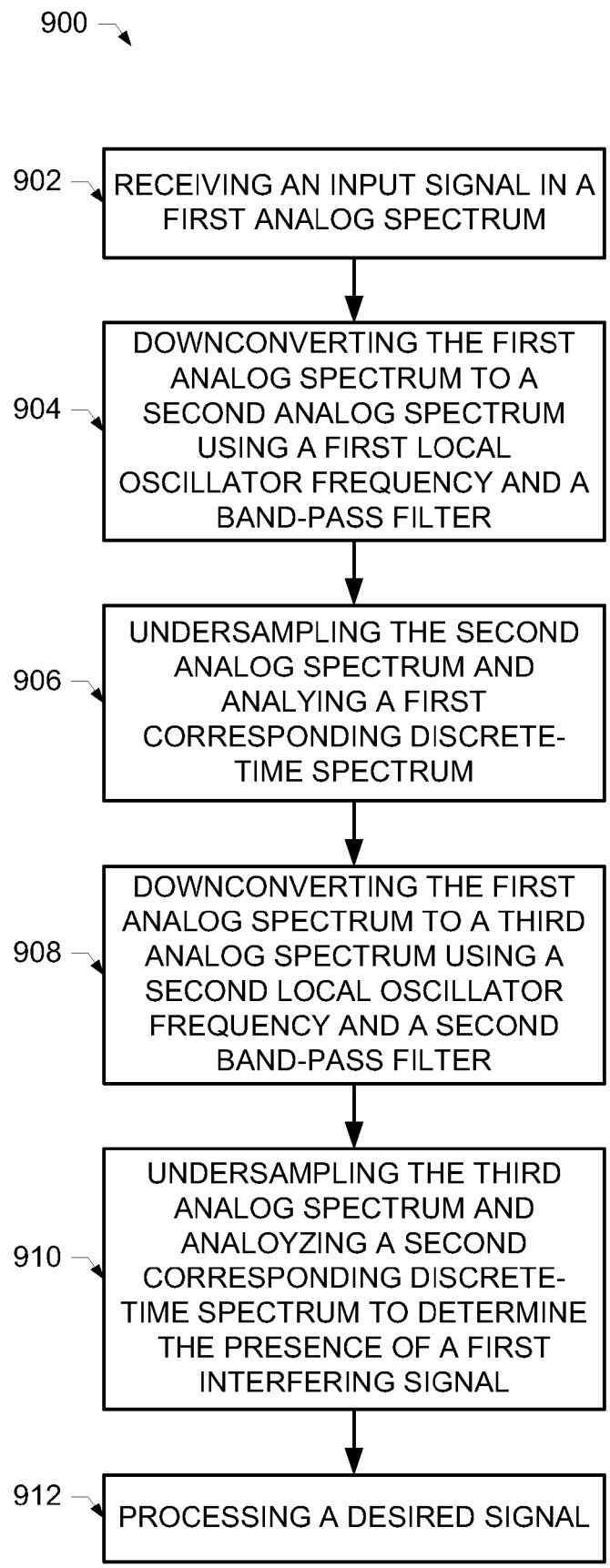
FIG. 9 depicts one embodiment of a method for receiving a desired signal.

According to an alternative embodiment depicted in FIG. 9, a method 900 is provided for receiving a desired signal at a desired channel frequency, including receiving an input signal in a first analog spectrum (block 902), downconverting the first analog spectrum to a second analog spectrum using a first local oscillator frequency and a band-pass filter (block 904), undersampling the second analog spectrum and analyzing a first corresponding discrete-time spectrum (block 906), downconverting the first analog spectrum to a third analog spectrum using a second local oscillator frequency and a second band-pass filter (block 908), undersampling the third analog spectrum and analyzing a second corresponding discrete-time spectrum to determine the presence of a first interfering signal (block 910), and processing a desired signal (block 912).

According to another embodiment, the second and the third analog spectrums are bandlimited to two Nyquist bands. The analog bandwidths of the first and the second bandpass filters are greater than the Nyquist bandwidth and less than twice the Nyquist bandwidth. Furthermore, the input signal is in a Distance Measurement Equipment (DME) band, a Tactical Air Navigation (TACAN) band, an Air traffic control Transponder and Universal access transceiver (UAT) band, or another avionics band.

Figure 10:
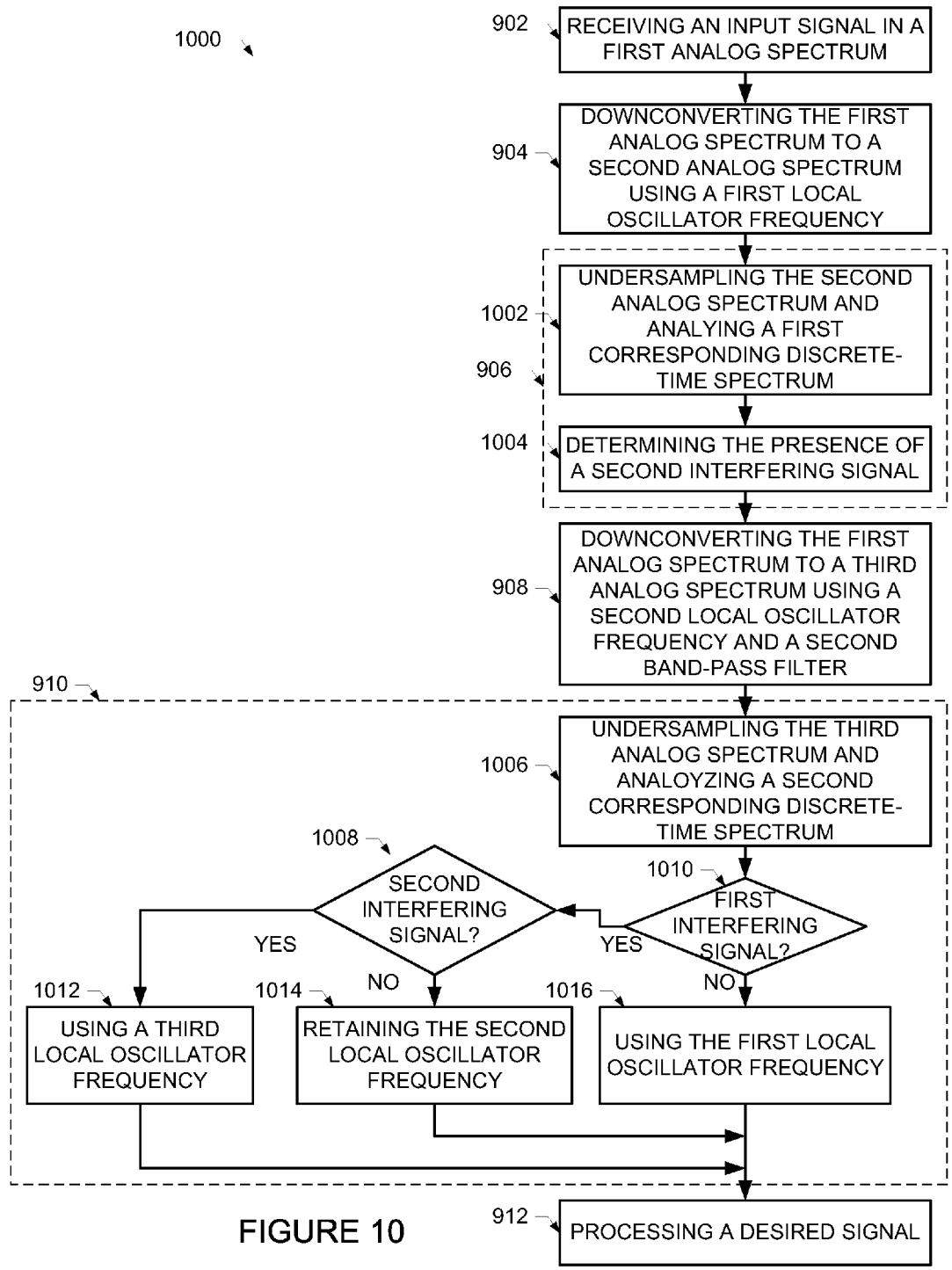
FIG. 10 depicts another embodiment of a method for receiving a desired signal.

According to an alternative embodiment depicted in FIG. 10, a method 1000 similar to the method 900 is provided for receiving a desired signal at a desired channel frequency, wherein undersampling the second analog spectrum and analyzing a first corresponding discrete-time spectrum (block 906) further includes determining the presence of a first second signal (block 1004). The second interfering signal may potentially cause interference with a desired signal in the second discrete-time spectrum. Furthermore, analyzing the shifted discrete-time spectrum for the presence of an interfering signal (block 910) includes determining whether a first interfering signal is present at a channel frequency $f_{I1}$. If such interfering signal is not present (negative result from block 1010), indicating that the signal at the desired channel frequency $f_D$ in the first discrete-time spectrum is not contributed by any interfering signal from the channel frequency $f_{I1}$, the method 1000 proceeds to using the first local oscillator frequency (block 1016) to process a desired signal (block 912). If the first interfering signal is present at the channel frequency $f_{I1}$ (positive result from block 1010), indicating that the signal at the desired channel frequency $f_D$ in the first discrete-time spectrum is contributed by the first interfering signal from the channel frequency $f_{I1}$, the method 1000 proceeds to checking whether a second interfering signal is present at a channel frequency $f_{I2}$ (block 1008) according to the result from block 1004. If the second interfering signal is not present at the channel frequency $f_{I2}$ (negative result from block 1008), indicating that the desired channel frequency in the second discrete-time spectrum does not contain any interfering signal from the channel frequency $f_{I2}$, the method 1000 then proceeds to retaining the second local oscillator frequency (block 1014) to process a desired signal (block 912). If the second interfering signal is present (positive result from block 1008), indicating that the desired channel frequency in the second discrete-time spectrum contains an interfering signal from the channel frequency $f_{I2}$, the method 1000 then proceeds to again shifting the local oscillator frequency to a third local oscillator frequency (block 1012) to process a desired signal (block 912).

According to still another embodiment, there may be more than one interfering signals that may potentially interfere with the desired signal when the local oscillator frequency is shifted. In order to process the desired signal, the method 1000 may select a targeted local oscillator frequency according to the result of a pre-check process in block 1004. Specifically, in block 1004, the method 1000 may check more than one channel frequency in the first discrete-time spectrum to identify a targeted local oscillator frequency, wherein the selected local oscillator frequency does not cause interference with the desired signal when a discrete-time spectrum is generated. Accordingly, in block 1010, if it is determined that a first interfering signal is present at the channel frequency $f_{I1}$ (positive result from block 1010), the method 1000 may then shift to the targeted local oscillator frequency identified in block 1004 to process the desired signal (block 912).

Figure 11:
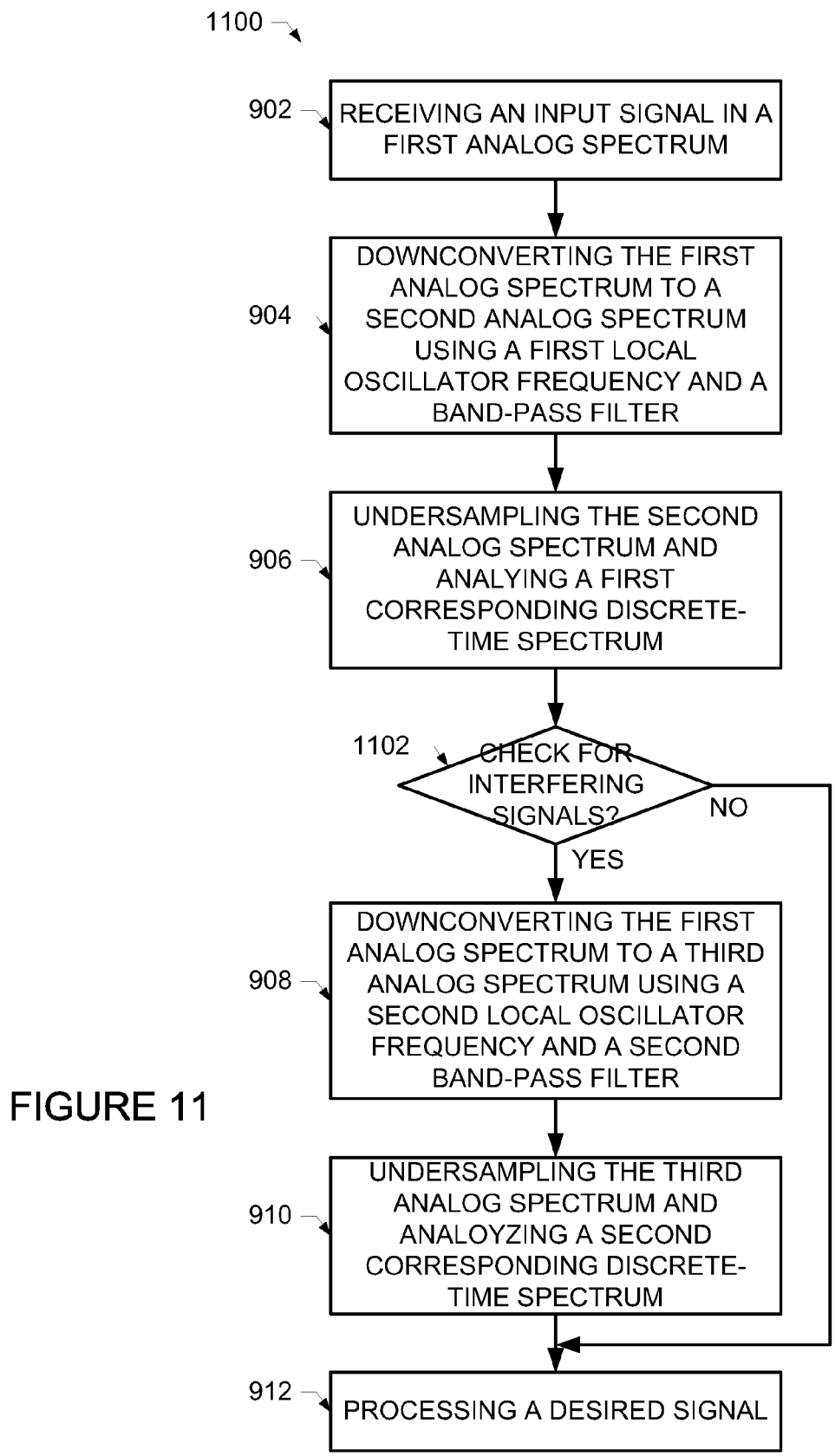
FIG. 11 depicts still another embodiment of a method for receiving a desired signal.

According to still another embodiment depicted in FIG. 11, a method 1100 similar to the method 900 is provided for receiving a desired signal, wherein downconverting the first analog spectrum to a third analog spectrum using a second local oscillator frequency and a second band-pass filter (block 908) and undersampling the third analog spectrum and analyzing a second corresponding discrete-time spectrum to determine the presence of a first interfering signal (block 910) are performed periodically. For example, a timer may be set at block 1102, wherein the method 1100 proceeds to downconverting the first analog spectrum to a third analog spectrum using a second local oscillator frequency and a second band-pass filter (block 908) when the timer is expired (positive result from block 1102), or otherwise to processing a desired signal (block 912). As another example, in block 1102, the received signal at the desired channel frequency may be analyzed for potential interference. If potential interference is detected (positive result from block 1102), the method 1100 then proceeds to downconverting the first analog spectrum to a third analog spectrum using a second local oscillator frequency and a second band-pass filter (block 908), or otherwise directly to processing a desired signal (block 512).

Those skilled in the art to which the present invention pertains may make modifications resulting in other embodiments employing principles of the present invention without departing from its spirit or characteristics. Accordingly, the described embodiments are to be considered in all respects only as illustrative, and not restrictive, and the scope of the present invention is, therefore, indicated by the appended claims rather than by the foregoing description. Consequently, while the present invention has been described with reference to particular embodiments, modifications apparent to those skilled in the art would still fall within the scope of the invention.

We claim:

1. A method for receiving a desired signal at a signal receiver comprises,
   (a) generating an analog spectrum using a first local oscillator frequency and a bandpass filter;
   (b) generating a discrete-time spectrum by undersampling the analog spectrum such that aliasing of communications channel frequencies occurs within the discrete-time spectrum;
   (c) determining that a signal is present at a desired channel frequency;
   (d) shifting to a second local oscillator frequency to generate a shifted analog spectrum and a correspondingly shifted discrete-time spectrum;
   (e) analyzing the shifted discrete-time spectrum for the presence of an interfering signal; and
   (f) processing the desired signal.

2. The method of claim 1 wherein the analog spectrum is bandlimited to two Nyquist bands.

3. The method of claim 1 wherein an analog bandwidth of the bandpass filter is greater than the Nyquist bandwidth.

4. The method of claim 3 wherein the analog bandwidth of the bandpass filter is less than twice the Nyquist bandwidth.

5. The method of claim 1 wherein said determining that the signal is present at a desired channel frequency is performed via a Fast Fourier Transform (FFT) means or a digital down-converter means comprising a numerically controlled oscillator means and a low pass digital filter means.

6. The method of claim 1 wherein processing the desired signal is performed via returning to the first local oscillator frequency.

7. The method of claim 1 further comprising analyzing the discrete-time spectrum for the presence of a potential interfering signal, wherein the potential interfering signal causes interference in the shifted analog spectrum.

8. The method of claim 7 further comprising determining that the potential interfering signal is not present and retaining the second local oscillator frequency.

9. The method of claim 7 further comprising determining that the potential interfering signal is present and again shifting to a third local oscillator frequency to generate a second shifted discrete time spectrum.

10. The method of claim 1 wherein the desired signal is in a Distance Measurement Equipment (DME) band, a Tactical Air Navigation (TACAN) band, an Air traffic control Transponder and Universal access transceiver (UAT) band, or a Radio Technical Commission for Aeronautics(RTCA) band.

11. The method of claim 1 wherein (d) and (e) are performed periodically.

12. A method for receiving a desired signal at a desired channel frequency includes,
   (a) receiving an input signal in a first analog spectrum;
   (b) downconverting the first analog spectrum to a second analog spectrum using a first local oscillator frequency and a band-pass filter;
   (c) undersampling the second analog spectrum and analyzing a first corresponding discrete-time spectrum;
   (d) downconverting the first analog spectrum to a third analog spectrum using a second local oscillator frequency and a second band-pass filter;
   (e) undersampling the third analog spectrum and analyzing a second corresponding discrete-time spectrum to determine the presence of a first interfering signal;
   (f) processing the desired signal.

13. The method of claim 12 wherein the second and the third analog spectrums are bandlimited to two Nyquist bands.

14. The method of claim 12 wherein the analog bandwidths of the first and the second bandpass filters are greater than the Nyquist bandwidth.

15. The method of claim 12 wherein the analog bandwidths of the first and the second bandpass filters are less than twice the Nyquist bandwidth.

16. The method of claim 12 further comprises determining that the first interfering signal is not present and processing the desired signal is performed via the first local oscillator frequency.

17. The method of claim 12 further comprising analyzing the first corresponding discrete-time spectrum to determine the presence of a second interfering signal, wherein the second interfering signal causes interference in the second discrete-time spectrum.

18. The method of claim 17 further comprising determining that the second interfering signal is not present and processing the desired signal is performed via the second oscillator frequency.

19. The method of claim 17 further comprising determining that the second interfering signal is present and processing the desired signal is performed via a third local oscillator frequency.

20. The method of claim 12 wherein the input signal is in a Distance Measurement Equipment (DME) band, a Tactical Air Navigation (TACAN) band, an Air traffic control Transponder and Universal access transceiver (UAT) band, or another avionics band.

21. The method of claim 12 wherein (d) and (e) are performed periodically.

22. The method of claim 19 wherein more than three local oscillator frequencies are utilized to receive the desired signal.

23. An apparatus for receiving a desired signal at a signal receiver comprises,
a signal converter for downconverting an input signal using a local oscillator;
a bandpass filter for generating an analog spectrum;
an analog-to-digital converter for generating a discrete-time spectrum by undersampling the analog spectrum such that aliasing of communications channel frequencies occurs within the discrete-time spectrum; and
a signal processor for determining that a signal is present at a desired channel frequency, controlling the local oscillator to alter a frequency of the local oscillator used by the signal converter, analyzing the discrete-time spectrum for the presence of an interfering signal, and processing the desired signal.

24. The apparatus of claim 23 wherein the analog spectrum is bandlimited to two Nyquist bands.

25. The apparatus of claim 23 wherein the analog bandwidth of the bandpass filter is greater than the Nyquist bandwidth.

26. The apparatus of claim 23 wherein the analog bandwidth of the filter is less than twice the Nyquist bandwidth.

27. The apparatus of claim 23 wherein said determining that the signal is present at a desired channel frequency is performed via a Fast Fourier Transform (FFT) means or a digital downconverter means comprising a numerically controlled oscillator means and a low pass digital filter means.

28. The apparatus of claim 23 wherein the frequency of the local oscillator is shifted such that the content of the discrete-time spectrum is shifted correspondingly.

29. The apparatus of claim 23 wherein the desired signal is in a Distance Measurement Equipment (DME) band, a Tactical Air Navigation (TACAN) band, an Air traffic control Transponder and Universal access transceiver (UAT) band, or a Radio Technical Commission for Aeronautics(RTCA) band.

30. The apparatus of claim 23 wherein the signal processor is a digital signal processor (DSP) means, a firmware means driven by a software means, or an application-specific integrated circuit (ASIC) means.

* * * * *